(12) United States Patent
Maas, III

(10) Patent No.: US 6,178,271 B1
(45) Date of Patent: Jan. 23, 2001

(54) METHODS AND SYSTEMS FOR REGISTERING IMAGE DATA

(75) Inventor: Luis C. Maas, III, Brookline, MA (US)

(73) Assignee: The McLean Hospital Corporation, Belmont, MA (US)

(*) Notice: Under 35 U.S.C. 154(b), the term of this patent shall be extended for 0 days.

(21) Appl. No.: 09/212,007

(22) Filed: Dec. 15, 1998

Related U.S. Application Data

(63) Continuation-in-part of application No. 08/639,824, filed on Apr. 29, 1996, now Pat. No. 5,850,486.

(51) Int. Cl.$^7$ .............................. G06K 9/32; G06K 9/36; G06K 9/40; G06K 9/64
(52) U.S. Cl. .................. 382/294; 382/275; 382/278; 382/280; 382/295; 382/296
(58) Field of Search .................................... 382/275, 278, 382/294, 295, 296, 309, 280, 276; 358/405, 452, 463

(56) References Cited

U.S. PATENT DOCUMENTS

| | | | |
|---|---|---|---|
| 4,616,180 | 10/1986 | Compton | 324/309 |
| 4,730,620 | 3/1988 | Bailes | 128/653.2 |
| 4,761,613 | 8/1988 | Hink | 324/309 |
| 4,937,526 | 6/1990 | Ehman et al. | 324/309 |
| 4,968,935 | 11/1990 | Ehman et al. | 324/309 |
| 5,005,578 | 4/1991 | Greer et al. | 128/653.2 |
| 5,035,244 | 7/1991 | Stokar | 128/653.2 |
| 5,113,137 | 5/1992 | Koizumi et al. | 324/307 |
| 5,115,812 | 5/1992 | Sano et al. | 128/653.2 |
| 5,181,260 | * 1/1993 | Kurosu et al. | 382/289 |
| 5,243,284 | 9/1993 | Noll | 324/309 |
| 5,251,128 | 10/1993 | Crawford | 128/653.2 |
| 5,287,276 | 2/1994 | Crawford et al. | 378/4 |
| 5,295,200 | * 3/1994 | Boyer | 382/294 |
| 5,323,110 | 6/1994 | Fielden et al. | 324/309 |
| 5,337,231 | * 8/1994 | Nowak et al. | 382/294 |
| 5,412,322 | 5/1995 | Wollin | 324/318 |
| 5,453,840 | 9/1995 | Parker et al. | 356/400 |
| 5,550,937 | * 8/1996 | Bell et al. | 382/294 |
| 5,602,476 | 2/1997 | Liu et al. | 324/309 |

OTHER PUBLICATIONS

Cesmeli et al., "An Automated Temporal Alignment Technique for the Translational and Rotational Correction of Digital Radiographic Images of Bjork–Shiley Heart Valves," IEEE, pp. 619–621, 1993.

Mosquera et al., "Noise Behavior in Gridding Reconstruction," IEEE, pp. 2281–2284, 1995.

Apicella et al., "Fast Multi–Modality Image Matching," SPIE, 1092:252–263, Medical Imaging III: Image Processing, 1989.

Cideciyan et al., "Registration of High Resolution Images of the Retina," SPIE, 1652:310–322, Medical Imaging VI: Imaging Processing, 1992.

Fu et al., "Orbital Navigator Echoes for Motion Measurements in Magnetic Resonance Imaging," MRM, 34:746–753, 1995.

(List continued on next page.)

Primary Examiner—Phuoc Tran
Assistant Examiner—Daniel G. Mariam
(74) Attorney, Agent, or Firm—Fish & Richardson, P.C.

(57) ABSTRACT

Methods and systems for estimating a correction angle that rotationally aligns a first polar centered image with a second polar centered image, wherein the first and second polar centered images includes values on a polar grid having evenly spaced polar angle coordinates for each of at least one radial distance coordinate, include the following steps: calculating a polar cross-power spectrum for the first and second polar centered images, the polar cross-power spectrum comprising a phase profile having at least polar angular frequency coordinates; and fitting a linear function of the angular frequency coordinate to the phase profile of the polar cross-power spectrum to determine the correction angle.

25 Claims, 6 Drawing Sheets

OTHER PUBLICATIONS

Hajnal et al., "Artifacts Due to Stimulus Correlated Motion in Functional Imaging of the Brain," MRM, 31:283–291, 1994.

Jackson et al., "Selection of a Convolution Function for Fourier Inversion Using Gridding," IEE Transactions On Medical Imaging, 10:473–478, Sep. 1991.

Pelizzari et al., "Accurate Three–Dimensional Registration of CT, PET, and/or MR Images of the Brain," The Journal Of Computer Assisted Tomography, 13:20–26, Jan./Feb. 1989.

William K. Pratt, "Correlation Techniques of Image Registration," IEEE Transactions On Aerospace And Electronic Systems, AES–10(3):353–358, May 1974.

Woods et al., "Rapid Automated Algorithm for Aligning and Reslicing PET Images," Journal Of Computer Assisted Tomography, 16:620–633, Ju./Aug. 1992.

Maas et al., "Decoupled Automated Rotational and Translational Registration for Functional MRI Time Series Data: The DART Registration Algorithm," Magnetic Resonance in Medicine, 37:131–139, Jan. 1997.

* cited by examiner

METHODS AND SYSTEMS FOR REGISTERING IMAGE DATA

CROSS REFERENCE TO RELATED APPLICATIONS

This application is a continuation-in-part application from U.S. Ser. No. 08/639,824 filed Apr. 29, 1996, which is now U.S. Pat. No. 5,850,486 the entire contents of which are incorporated herein by reference.

This disclosure contains an appendix listing source code, which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The invention relates to registering multiple frames of two-dimensional image data.

Magnetic resonance imaging (MRI) is a widely used diagnostic technique where radio frequency (RF) signals are analyzed to produce diagnostic information. Echo-planar imaging (EPI) is a subset of MRI that provides high temporal resolution achieved with faster imaging techniques, and typically resulting in large image data sets. One application of EPI is functional magnetic resonance imaging (fMRI), where a time series of images is acquired for a selected plane (or planes) of a subject. In challenge-based fMRI of the human brain, a time series of images of one or more planes within a subject's brain is collected while the subject is exposed to a sequence of stimulus conditions, to identify functional changes in brain characteristics.

The high spatial resolution of EPI makes challenge-based experiments sensitive to subject movements on the scale of millimeters or less. Stimulus-correlated movements of the subject may lead to false results. The false information introduced by the subject's movement is commonly referred to as motion artifact. In order to analyze the time series of images, motion artifacts must be removed by registering the series of images. Proper inter-frame registration of the time series of images to remove motion artifact is particularly important in studies in which the subject's motion is an integral part of the experiment, such as experiments that require spoken responses or the performance of motor tasks.

Techniques used to register image sets include the use of physical immobilization devices to maintain the subject in a known position or the placement of external fiduciary markers as landmarks for post-processing alignment.

Approaches used after the image data is acquired include landmark matching, surface matching, brute force least-squares estimation, iterative least-squares estimation, and variations thereof. Landmark matching is a manual process that requires trained personnel to accurately identify landmarks in each image.

Surface matching techniques may be computationally intensive when applied to large fMRI time series data. Also, various post-processing techniques construct the "registered" image by linear interpolation of the "misregistered" image, a technique that may introduce aliasing noise and high-spatial-frequency attenuation into the final corrected image.

SUMMARY OF THE INVENTION

The invention features methods and systems that align a first image with a second image.

To estimate a rotational correction angle that rotationally aligns the first and second images, the methods can include calculating the power spectra of the images (i.e., the modulus square of the Fourier transform of the images), or alternatively, the magnitudes of the Fourier transforms of the images (i.e., by eliminating the phase component of the Fourier transformed images) to decouple translation from rotation and produce rotationally centered images. The centered images are rotated from one another by the same angle as whatever rotation is present between the first and second image, however, the centered images do not include whatever translation is present between the first and second images. As a result, the correction angle for the first and second images equals the correction angle that rotationally aligns the centered images.

To estimate the correction angle that rotationally aligns the centered images, the methods can include converting the centered images into polar coordinates and calculating the polar cross-power spectrum of the polar centered images. The polar cross-power spectrum equals the product of the one-dimensional Fourier transform of the first polar centered image with respect to the polar angle for one or more radial distances and the complex conjugate of the one-dimensional Fourier transform of the second polar centered image with respect to the polar angle for the one or more radial distances. For example, the polar cross-power spectrum can be calculated at a single radial distance (producing a vector with values for each polar angle frequency), multiple radial distances (producing a matrix with values for each polar angle frequency and radial distance), or all of the radial distances included in the polar centered images (producing a matrix with values for each polar angle frequency and radial distance). The polar cross-power spectrum can also be calculated by averaging or weighting contributions from different radial distance coordinates. The correction angle is determined by fitting, e.g., by least squares regression, the phase profile of the polar cross-power spectrum to the product $k_\theta \Delta$, where $\Delta$ is the rotational correction angle and $k_\theta$ is the angular frequency coordinate of the phase profile of the cross-power spectrum.

Once the correction angle is determined, the first image is rotated by the correction angle to rotationally align the first and second images. Thereafter, the rotationally aligned images can be translationally aligned.

In general, in one aspect, the invention feature a method for estimating a correction angle that rotationally aligns a first polar centered image with a second polar centered image, wherein the first and second polar centered images include values on a polar grid having evenly spaced polar angle coordinates for each of at least one radial distance coordinate. The method includes: calculating a polar cross-power spectrum for the first and second polar centered images, the polar cross-power spectrum including a phase profile having at least polar angular frequency coordinates; and fitting a linear function of the angular frequency coordinate to the phase profile of the polar cross-power spectrum to determine the correction angle.

The method can include any of the following features. The polar cross-power spectrum and phase profile can be matrices having polar angular frequency coordinates and radial distance coordinates. Alternatively, the polar cross-power spectrum and phase profile can be vectors having only polar angular frequency coordinates. The linear function can be $k_\theta \Delta$ where $k_\theta$ is the polar angular frequency coordinate and $\Delta$ is the correction angle. The fitting step can include using a least squares regression.

In some embodiments, the fitting step includes unwrapping values for the phase profile based on an estimate for the correction angle. The fitting step can further include determining the estimate by fitting a subset of values for the phase profile to the linear function, wherein the subset of values corresponds to angular frequencies $k_\theta$ that are less than $2\pi$ divided by an upper limit for the correction angle.

In other embodiments, the fitting step includes determining a first estimate $\Delta^{(1)}$ for the correction angle based by fitting a subset of values for the phase profile to the linear function, wherein the subset of values corresponds to angular frequencies $k_\theta$ that are less than $2\pi$ divided by an upper limit for the correction angle. The fitting step can further include determining a correction to the first estimate $\Delta^{(1)}$ by calculating a residual phase equal to the phase profile subtracted by $k_\theta \Delta^{(1)}$ and fitting the residual phase to another linear function.

In another aspect, the invention features estimating a correction angle that rotationally aligns a first image with a second image, wherein the first and second images each include values on an evenly spaced Cartesian grid. The method includes: Fourier transforming the first and second images to produce first and second k-space images, wherein values of the first and second k-space images include complex values on an evenly spaced k-space Cartesian grid; generating first and second centered images from the first and second k-space images with a mapping function that maps the absolute value of each complex value in the first and second k-space images to generate a corresponding value in the first and second centered images; converting the first and second centered images from Cartesian coordinates to polar coordinates to produce first and second polar centered images; and estimating the correction angle for the first and second images by estimating a correction angle for the first and second polar centered images according to the methods described herein.

The mapping function can square the absolute value of each complex value in the first and second k-space image to produce the corresponding value in the first and second centered images. Alternatively, the mapping function can leave the absolute value of each complex value in the first and second k-space image unchanged to produce the corresponding value in the first and second centered images. Also, the converting step can include logarithmically scaling the first and second centered images with respect to a radial frequency component to produce the first and second polar centered images.

In another aspect, the invention features a method for estimating a correction angle that rotationally aligns a first centered image with a second centered image, wherein the first and second centered images each include values on a Cartesian grid. The method includes: converting the first and second centered images from Cartesian coordinates to polar coordinates to produce first and second polar centered images; and estimating the correction angle for the first and second centered images by estimating a correction angle for the first and second polar centered images according to the methods described herein.

In another aspect, the invention features a method for rotationally aligning a first image with a second image. The method includes: estimating a correction angle for the first and second images according to the method described above; and rotating the first image by the correction angle for the first and second images, thereby aligning the first image with the second image.

The rotating step can include: converting the first image into polar coordinates to produce a first polar image; Fourier transforming the first polar image with respect to the polar angle coordinate; multiplying the Fourier transformed first polar image by a complex exponential having the linear function as an argument; inverse Fourier transforming the multiplied Fourier transformed first polar image with respect to the polar angle coordinate to produce a rotated first polar image; and converting the rotated first polar image into Cartesian coordinates to produce a rotated first image. The complex exponential can be $\exp(-ik_\theta \Delta)$, where $k_\theta$, is the polar angular frequency coordinate and $\Delta$ is the correction angle.

In another aspect, the invention features a method of aligning a first image with a second image. The method includes: rotationally aligning the first image with the second image using the method described above; and translationally aligning the rotationally aligned first image with the second image.

In general, in another aspect, the invention features a method for aligning a first image with a second image, wherein the first and second images each include values on a Cartesian grid. The method includes: calculating power spectra for the first and second images; converting the power spectra from Cartesian coordinates to polar coordinates; calculating a polar cross-power spectrum for the polar power spectra, the polar cross-power spectrum including a phase profile having at least polar angular frequency coordinates; fitting a linear function of the polar angular frequency coordinate to the phase profile of the polar cross-power spectrum to determine a correction angle that rotationally aligns the power spectra; rotating the first image by the correction angle; and translationally aligning the rotated first image with the second image.

In general, in another aspect, the invention features a method of rotationally aligning a first image with a second image, wherein the first and second images each include values that are uniformly spaced on a Cartesian grid. The method includes: estimating a correction angle to rotationally align the first image with the second image; and rotating the first image by the estimated correction angle by using a regridding technique, wherein the regridding techniques includes: converting the first image from image space to k-space; sampling a convolution of the k-space image and a filter function at coordinates that when rotated by the estimated correction angle map onto a k-space Cartesian grid; assigning values to the k-space Cartesian grid based on the sampled convolution to produce a rotated k-space image; and inverse Fourier transforming the rotated k-space image to produce the rotated first image.

Embodiments of the method can include any of the following features. Converting the rotated k-space image can include dividing an inverse Fourier transform of the rotated k-space image by an inverse Fourier transform of the k-space Cartesian values of the filter function to produce the rotated first image. The filter function can be a circularly-symmetric Hamming window.

The estimating step can include: converting the first and second images into first and second k-space polar images; cross-correlating at least a portion of the first k-space polar image with a corresponding portion of the second k-space polar image along the polar angle axis; and determining the correction angle from the cross-correlation. The portions of the k-space polar images can be the values at intermediate k-space radii. The k-space polar images can be determined from logarithms of power spectra of the Fourier transforms of the first and second images.

Converting the first and second images into first and second k-space polar images can include: Fourier transforming the first and second images; computing power spectra of the transformed images; and sampling a convolution of each power spectrum with a common filter function at polar coordinates to produce the k-space polar images.

In another aspect, the invention features a method of registering a first image with a second image. The method includes: rotationally aligning the first and second images according to the method using regridding described above; and translationally aligning the rotated first image with the second image.

The invention also features a method of translationally aligning a first image with a second image. The method includes: Fourier transforming the first and second images into k-space to produce first and second k-space images; computing a cross-power spectrum of the first and the second images by multiplying the Fourier transform of the first image by the complex conjugate of the Fourier transform of the second image, the cross-power spectrum having a phase profile; fitting the phase profile of the cross-power spectrum to a k-space phase-plane; multiplying the first k-space image by a k-space phase-plane that is a conjugate of the fitted k-space phase-plane; and inverse Fourier transforming the multiplied k-space image to translationally align the first image with the second image.

The method can include any of the following features. The fitting step can include performing a least squares regression on the phase values of the cross-power spectrum. The phase values of the cross-power spectrum can be weighted by the magnitude values of the cross-power spectrum during the least squares regression. The method can further include rotationally aligning the first image with the second image.

In general, in another aspect, the invention features a computer readable medium storing a program that causes a processor to perform the steps of any of the methods described herein.

In another aspect, the invention features a system for processing a series of images. The system includes: an input port that receives the series of images; a data storage device, operably coupled with the input port, that stores the images; and a processor, operably coupled with the input port and data storage device, that registers the images; wherein the processor performs the steps of any of the methods described above.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The present invention provides an automated, one-pass, inter-frame image registration system that achieves computational efficiency by decoupling rotational and translational correction. This approach reduces complexity, provides for the application of faster correction techniques, and eliminates the need for iterative methods. The present invention can be used to register a wide variety of image data including MRI, CT, X-ray, and traditional photography, and any two-dimensional data set subject to planar rigid body motion. In addition, the rotational correction based on a polar cross-power spectrum can determine a correction angle with a resolution greater than the angular resolution of the polar images.

Other features and advantages of the invention will be apparent from the following detailed description, and from the claims.

DETAILED DESCRIPTION

Figure 1:
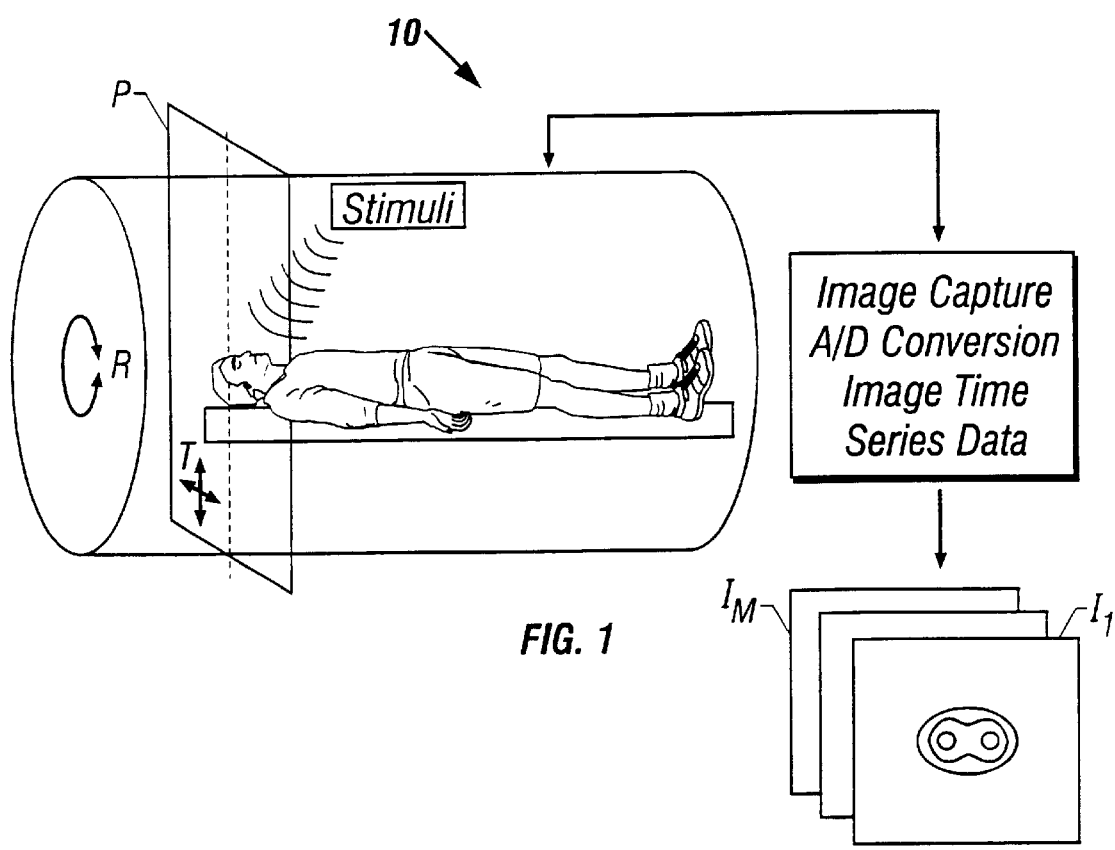
FIG. 1 is a schematic diagram depicting the collection of fMRI time series data.

The invention features methods and systems to rotationally and translationally align images, such as image time series data. Image time series data refers to a sequence of two-dimensional images captured over time. In one embodiment, the time period between images is relatively short, e.g., one second or less. In another embodiment, the time period may be years, as in aerial photography of a section of land. The images may be of an animate or inanimate subject. In a further embodiment, the images could be three-dimensional images.

One example of an image is a cross-sectional image or slice of a human brain. The image data is the stored information that represents the image. The image data can be an analog hard copy, e.g., an X-ray negative or traditional photographic print. Also, the image data can be stored in an electronic format and displayed on a monitor. The image data can be converted from hard copy to electronic format, and electronic format to hard copy, by known techniques.

In fMRI, image time series data is processed to identify and analyze changes in the image that occur over time and/or in response to external stimuli. There are three basic steps for processing image time series data: (1) obtain the raw time series image data; (2) register or align the time series image data; and (3) process the registered time series image data. The present invention relates to step (2), registration of the time series image data. Without registration step (2), processing step (3) may not provide useful, reliable information because of movement of the subject in step (1).

Registration refers to correction of inter-frame rotational and translational motion of the imaged subject (or motion of the image capturing device). Registration is used to provide a time series of images that can be processed to identify and analyze changes in the images caused by factors other than inter-frame motion, or to line-up the images for other purposes. The present invention does not address out-of-plane motion.

The correction of in-plane, inter-frame motion is simplified by separating correction into two steps: (a) the correction of rotation, and (b) the correction of translation. Dividing the correction problem into two steps reduces the overall complexity of registration. Faster techniques are used to perform each correction step than is possible for performing rotational and translational correction together. Also, the need for iterative techniques is eliminated.

The ability to separate inter-frame motion into two parts is derived from the relationship between rotations and translations in the real image-space, and their respective transformations within k-space. The real image-space and k-space are uniquely related by Fourier transformation. A rotation about the center of image-space maps to an equivalent rotation about the center of k-space, while a linear translation in image-space maps to phase changes in k-space. Since any combination of image rotations and linear translations are geometrically equivalent to a single linear translation and a rotation about the center of the image, rotations can be considered separately, i.e., decoupled from translations, by examining only k-space magnitude data or the power spectrum. Therefore, the effects of linear translations, which are encoded in the phases, are eliminated from rotational correction.

Decoupling rotation from translation shifts the center of rotation of the power spectrum to the center of k-space, regardless of the actual rotation center in image-space, and provides a means of "centering" the image for more rapid analysis. The estimation of rotation is reduced to a linear problem by recoding the power spectrum from Cartesian to polar coordinates. This transformation maps rotation about the center of k-space to a linear shift along the angle coordinate in polar coordinates. The angle of rotation from a first or "test" image to a second or "reference" image is then estimated by finding the wrapped angular shift which achieves the best match of the two polar power spectra. Computing the wrapped, i.e., periodic, cross-correlation of the two polar spectra for each angular shift quantifies this match, with the shift value at the maximum cross-correlation serving as the estimate of the angle of rotation.

Other methods different from cross-correlation can also be used to estimate the angle of rotation. Like the cross-correlation method, such methods convert real-space Cartesian images into Cartesian power spectra (or magnitude-only k-space images) to eliminate the effects of translation and produce centered images. Thereafter, they convert the Cartesian power spectra (or magnitude-only k-space images) into polar coordinates to produce centered images in polar coordinates. As described above, a rotation between a pair of real-space images, e.g., a test image and a reference image, causes an identical rotation between the pair of power spectra (or magnitude-only k-space images) corresponding to the pair of real-space images. The problem of estimating rotation therefore reduces to estimating the rotations between the pair of polar power spectra (or polar magnitude-only k-space images). Assuming that this pair of centered images are denoted as $d_1$ and $d_2$ and differ only by rotation, the two images $d_1$ and $d_2$ can be expressed as $d_1 = d(r,\theta)$ and $d_2 = d(r, \theta - \Delta)$, where r and θ are polar coordinates and where Δ is the angle of rotation. Rather than cross-correlate $d_1$ and $d_2$ to determine Δ, the cross-power spectrum of $d_1$ and $d_2$ can be calculated with respect to the polar coordinates to estimate the rotation angle.

To calculate the polar cross-power spectrum, $d_1$ and $d_2$ are Fourier transformed with respect to the polar angle coordinate for each of the radial distances. The angular rotation of $d_2$ by Δ produces a phase shift in the Fourier transform of $d_2$ with respect to the polar angle frequency. Symbolically:

if $d_1 = d(r,\theta) \leftrightarrow D(r,k_\theta)$, then $d_2 = d(r,\theta - \Delta) \leftrightarrow D(r,k_\theta) \cdot \exp[-ik_\theta \Delta]$ where kθ is polar angle frequency, D is the Fourier transformation of the image d with respect to the polar angle, and the bi-directional arrows indicate Fourier transformation pairs. The polar cross-power spectrum (polar CPS) of $d_1$ and $d_2$ equals the Fourier transform of $d_1$ with respect to polar angle multiplied by the complex conjugate of the Fourier transform of $d_2$ with respect to polar angle. As a result, the phase information associated with the images cancels leaving only the phase associated with the rotational shift. Symbolically:

$$CPS(r,k_\theta;d_1,d_2) = D \cdot \{D \cdot \exp[-ik_\theta \Delta]\}^*$$

$$= |D|^2 \cdot \exp[ik_\theta \Delta]$$

$$\angle CPS(r,k_\theta) = {}_\theta \Delta$$

where the asterisk indicates complex conjugation, the vertical bars indicate magnitude, and the angle sign ∠ indicates the phase. As shown above, the phase of the cross-power spectrum (CPS) modulo 2π defines a linear relation with the product of the angular frequency kθ and the rotation angle Δ. Therefore, the rotation angle Δ can be estimated from a least squares regression that fits data values for the phase of the cross-power spectrum $\angle CPS(k_r,k_\theta)$ to $k_{74}\Delta$ to estimate the rotation angle Δ.

Depending on the magnitude of the rotation angle Δ and the values for the angular frequency $k_\theta$, however, values for the product $k_\theta \Delta$ can include values outside a 2π interval, whereas values for the phase of the cross-power spectrum wrap around a 2π interval, e.g., an interval from 0 and 2π, or −π and π, such as would be returned from a conventional arctangent function. In particular, such 'wrapping' occurs when the rotation angle exceeds the angular sampling interval. The wrapping can negatively affect the accuracy of the least squares regression. To circumvent such wrapping either of the following two techniques can be used.

When performing the first technique, the cross-power spectrum is calculated for images $d_1$ and $d_2$ using an angular sampling interval that is large relative to values anticipated for the rotation angle Δ. For example, rotations in fMRI images are typically less than ten degrees, thus using an angular sampling interval of 2π/16 for the polar images to calculate the cross-power spectrum typically eliminates the phase wrapping. In other embodiments, a larger or smaller angular sampling interval, e.g., 2π/8, can be used. Based on the larger angular sampling intervals and a least squares regression, a first estimate $\Delta^{(1)}$ for the rotation angle is determined. Depending on the embodiment, the first estimate can be sufficient.

Alternatively, the phase of the cross-power spectrum for the images can be recalculated using a smaller angular sampling interval for which phase wrapping may occur. The recalculated phase of the cross-power spectrum is then unwrapped based on the first guess for the rotation angle, e.g., multiplies of 2π are added to the phase $\angle CPS(r,k_\theta)$ such that it is approximately equal to $k_\theta \Delta^{(1)}$). Thereafter, a second least squares regression estimates the rotation angle Δ based on the unwrapped values for the phase of the cross-power spectrum.

When performing the second technique, the cross-power spectrum is calculated for images $d_1$ and $d_2$ using an angular sampling interval for which phase wrapping may occur. To determine a first estimate $\Delta^{(1)}$ for the rotation angle, however, only values for the phase of the cross-power spectrum $\angle CPS(r,k_\theta)$ at small values for the angular frequencies $k_\theta$ are used in the least squares regression. For example, if the rotation angle is known to be less than 2π/n, then there is no phase wrapping for values of the phase $\angle CPS(r,k_\theta)$ at the first n values of $k_\theta$.

Using the first estimate $\Delta^{(1)}$ for the rotation angle, the values for the phase $\angle CPS(r,k_\theta)$ for angular frequencies $k_\theta$ greater than the first n values are unwrapped as described above. The least squares regression is then repeated using the additional unwrapped values for the phase $\angle\mathrm{CPS}(r,k_\theta)$ to improve the estimate for the rotation angle $\Delta$. In either of these methods, multiple estimates with corresponding increases in the amount of unwrapped data points used in the least squares regressions can be used before converging on a final estimate for the rotation angle $\Delta$.

Rather than unwrapping values for the phase $\angle\mathrm{CPS}(r,k_\theta)$ as described above, the first estimate $\Delta^{(1)}$ can be used to define a residual function equal to $\angle\mathrm{CPS}(r,k_\theta)-k_\theta\Delta^{(1)}$, which is substantially free of phase wrapping even for angular frequencies $k_\theta$ greater than the first n values. Thereafter, the least squares regression is repeated by fitting $\angle\mathrm{CPS}(r,k_\theta)-k_\theta\Delta^{(1)}$ to $k_\theta\Delta^{(2)}$ for data corresponding to the remaining angular frequencies $k_\theta$ or a subset of the remaining angular frequencies $k_\theta$. The final estimate for the rotation angle $\Delta$ is then given by $\Delta^{(1)}+\Delta^{(2)}$. Alternatively, more than two iterations can be use to improve the accuracy of the rotation angle $\Delta$, e.g., $\Delta$ can equal $\Delta^{(1)}+\Delta^{(2)}+\Delta^{(3)}$, where $\angle\mathrm{CPS}(r,k_\theta)-k_\theta\Delta^{(1)}-k_\theta\Delta^{(2)}$ is fit to $k_\theta\Delta^{(3)}$ for data corresponding to remaining angular frequencies $k_\theta$.

The cross-power spectrum method for estimating the rotation angle permits the estimated rotation angle to take on values that can be non-integer multiples of the angular sampling interval used in the polar images.

Once the angle of rotation between a test and reference image is known, the test image is rotated to match the orientation of the reference image, leaving only a linear translation between the reference and rotated test image. Rotating the test image is achieved by k-space regridding, which reduces high frequency attenuation and aliasing noise as compared to linear interpolation.

To rotate the test image using k-space regridding, the k-space grid of the test image is convolved with a continuous filter function, e.g., a Hamming window, chosen to have small side-lobes in image space. The resulting continuous k-space data are resampled along a new grid rotated about the center of k-space by the desired angle. The rotated k-space image is then inverse Fourier transformed back to image space, where it is then scaled by the inverse Fourier transform of the filter function to compensate for the roll-off characteristics of the filter mainlobe in image space. Small image-space filter sidelobes reduce the aliasing energy introduced into the new image, and a filter mainlobe similar in size to the image of interest allows accurate compensation of the introduced attenuation. For a general reference on regridding, see, e.g., J. I. Jackson et al. in *IEEE Trans. Med. Imaging.*, 10:473–478, 1991. In alternative embodiments, rotating the image can be performed using linear or other interpolation methods, e.g., truncated sinc interpolation, cubic spline interpolation, and z-chirp interpolation.

The test image can also be rotated using angular shift property of Fourier transforms for polar coordinates noted above. In the technique, the test image $d(x,y)$ is converted into polar coordinates $d(r,\theta)$. Alternatively, the test image may exist in polar coordinates, e.g., such as images recorded by computed axial tomography (CT). The polar test image is Fourier transformed with respect to the polar angle coordinate. The transformed polar image $D(r,k_\theta)$ is then multiplied by an exponential phase $\exp[ik_\theta\Delta]$ and then the multiplied transformed image is inverse Fourier transformed with respect to the polar angle coordinate to give the rotated image $d(r,\theta+\Delta)$ in image space. If desired, the rotated image in image space can be converted back to Cartesian coordinates, e.g., using regridding or filtered back-projection.

Once the rotational correction is made, correction for linear translation between the test and reference images is performed. In this case, the shift property of the Fourier transformation is applied to the Cartesian coordinates. In particular, a shift along a Cartesian spatial axis introduces a linear phase shift in the direction of the corresponding frequency axis. Symbolically:

if $d(x,y) \leftrightarrow D(k_x,k_y)$, then $d(x-\Delta x, y-\Delta y) \leftrightarrow \exp\{-i(k_x\Delta x+k_y\Delta y)\}\cdot D(k_x,k_y)$ where x and y are spatial coordinates, $k_x$ and $k_y$ are spatial frequencies, $\Delta x$ and $\Delta y$ are the linear displacements in image space, d is the image, D is the two-dimensional Fourier transformation of the image, and the bi-directional arrows indicate Fourier transformation pairs.

By computing the cross-power spectrum of the two oriented (but shifted) images, the phase information associated with the images cancels, leaving only the phase associated with the shift. Symbolically:

$$\mathrm{CPS}=D\cdot[\exp\{-i(k_x\Delta x+k_y\Delta y)\}\cdot D]^*$$

$$=\{D\cdot D^*\}\cdot\exp\{i(k_x\Delta x+k_y\Delta y)\}$$

$$=|D|^2\cdot\exp\{i(k_x\Delta x+k_y\Delta y)\}$$

$$\angle\mathrm{CPS}=\Delta x\cdot k_x+\Delta y\cdot k_y,$$

where CPS is the cross-power spectrum, the asterisk indicates complex conjugation, the vertical bars indicate magnitude, the angle sign indicates the phase angle, and D, $k_x$, $k_y$, $\Delta x$, and $\Delta y$ are defined as above.

The phase angle of the cross-power spectrum thus defines a "phase plane" in $k_x$ and $k_y$ with coefficients equal to the displacements $\Delta x$ and $\Delta y$ along each image axis. These coefficients are estimated by fitting a plane using a least squares regression, and they are then used to calculate a reciprocal exponential, i.e., a complex exponential with a phase-plane which is the conjugate of that fit to the data. As described above with regard to the rotational estimation, the least squares regressions may involve unwrapping of the phase angle from the cross-power spectrum. Once the translations are estimated, the k-space samples of the shifted image are multiplied by the reciprocal exponential and inverse Fourier transformed to yield a registered image.

The plane-fitting system does not require integer values for the shift coefficients $\Delta x$ and $\Delta y$; therefore, it permits the correction of sub-pixel shifts. The sequential correction of translation is referred to as phase-plane conjugation.

In one embodiment, decoupled, automated rotational and translational registration of image data is provided for fMRI time series data. Obtaining the raw fMRI time series data is achieved by known techniques using commercially available equipment. For EPI, a General Electric (GE) Signa 1.5 Tesla Magnetic Resonance Scanner (made by GE Medical Systems, Milwaukee, Wis.) is retrofit with an InstaScan® resonating whole body gradient set from Advanced NMR Systems, Inc. Other MRI models are also sold by GE, and other manufacturers of MRI scanners include Phillips, Siemens, and Toshiba.

FIG. 1 provides an example of the operation of a system for acquiring the fMRI time series data. A patient is initially positioned in MRI scanner 10. Conventional MRI images are used to define an image plane P (or planes) of interest. A sequence of M echo-planar images I per plane are captured, where M is typically 256 or 128, but could be any number. With a repetition time of about one second, it usually takes about four and one-half minutes to obtain 256 echo-planar images. MRI scanner 10 processes the M images ($I_1$ to $I_M$), converting each of the M two-dimensional k-space images from an analog signal to digital image data. The unregistered image time series data ($I_1$ to $I_M$) is then available for viewing or further processing.

Generally, the patient will not remain completely motionless during the imaging period. In fMRI, the patient is often subjected to one or more stimuli, such as a flashing light, which increases the likelihood that the patient will move. Therefore, there is a high probability that motion artifacts are introduced into the M images. Rotational and translational motion are shown in FIG. 1 by arrows R and T, respectively. EPI images are high resolution, and subject motion of as little as 0.2 mm can introduce motion artifacts into the image time series data. The motion artifacts, if not corrected, corrupt the temporal correlation between the stimulus and image, leading to inaccurate and unreliable results.

The MRI scanner generates the unregistered image data. Each image $I_A$, where $A=1, \ldots, M$, may be stored as digital information in an N-by-N square array of 16-bit unsigned integers, where N is typically 128 or 64. Thus, the time series image data consists of an array of N-by-N-by-M 16-bit unsigned integers. The image dimensions need not be square, and the dimensions may be varied depending on the particular application.

Depending on the particular MRI scanner, other data formats may also be used. The MRI scanner image data format typically is not suitable for the registration processing described below. Therefore, the MRI scanner image data format (e.g., 16-bit unsigned integers) is converted into a square array of 32-bit floating point numbers by known techniques.

A reference image $I_{Ref}$ to which all images $I_A$ are aligned is selected. The first, last, or any other image I can be selected as $I_{Ref}$. Using the middle image, $I_{M/2}$ as $I_{Ref}$ (e.g., image 128 of 256), provides several benefits, including the reduction in error by out-of-plane motion. Also, for any motion of the patient that has a linear component, the selection of the middle image provides a symmetrical correction to the ends.

Figure 2:
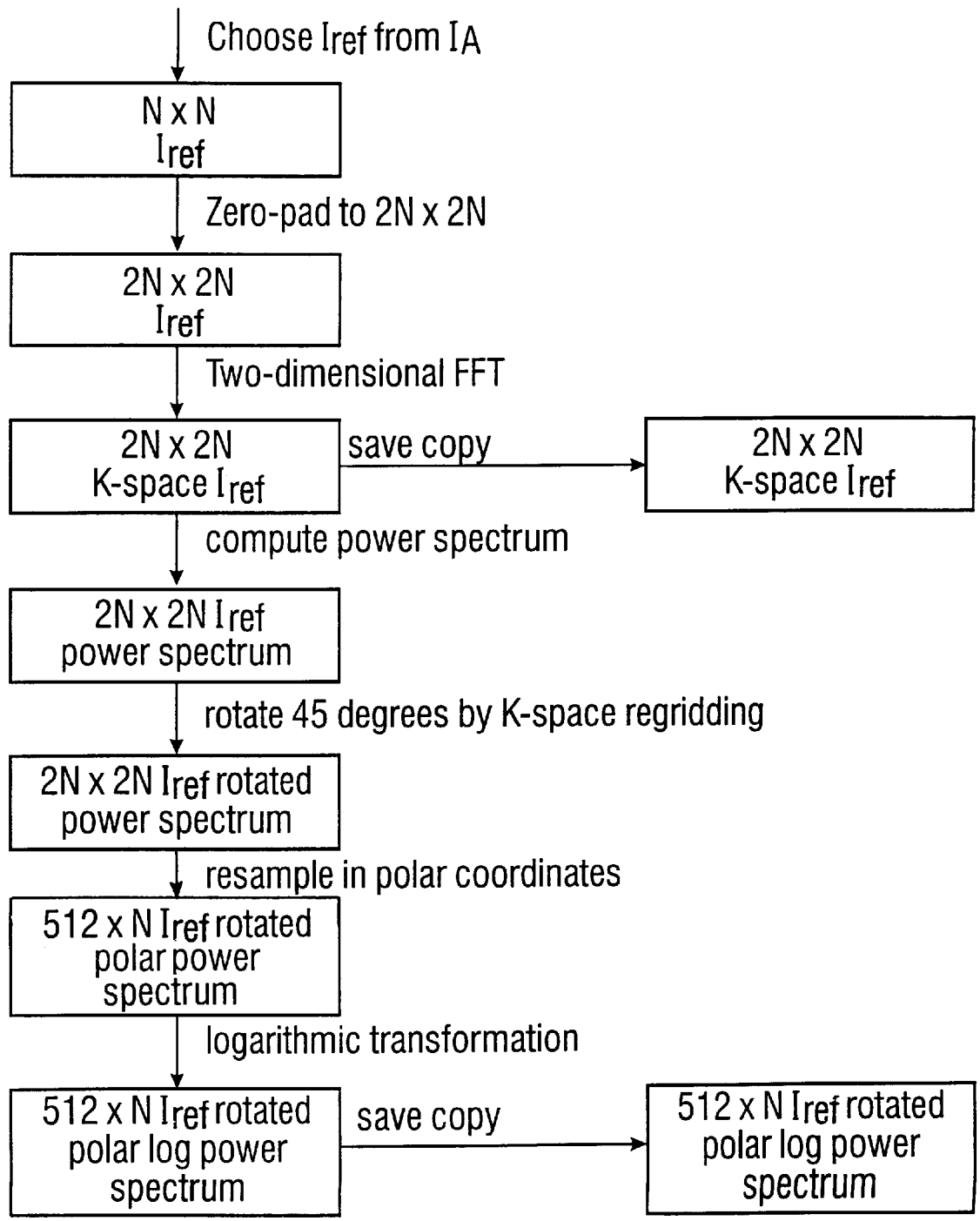
FIG. 2 is a flow chart of reference image processing.

FIG. 2 provides a flow diagram of processing $I_{Ref}$. $I_{Ref}$ is zero-padded to double the dimensions from N-by-N to 2N-by-2N. The 2N-by-2N $I_{Ref}$ is converted to k-space by two-dimensional fast Fourier transformation (FFT). A copy of the transformed 2N-by-2N $I_{Ref}$ is saved for later use. Next, the power spectrum is computed. The phase information, which contains the information relating to translation, is discarded by computing the power spectrum.

For small inter-frame rotation angles, correlation in the aliasing energy introduced by polar recoding of the images or windowing energy introduced by finite windowing can bias rotation estimates. Thus, for embodiments in which cross-correlation is used to estimate rotation, $I_{Ref}$ may be rotated by an offset angle, e.g., 45 degrees, using k-space regridding technique. Such an offset disrupts the aliasing correlation and maintains sensitivity to small rotations. Similarly, in embodiments in which a polar cross power spectrum is used to estimate the rotation angle, $I_{Ref}$ may be rotated by an offset angle, however, in both embodiments it is not necessary.

The 2N-by-2N k-space $I_{Ref}$ is converted from Cartesian to polar coordinates. The polar coordinate transformation is accomplished by polar resampling after convolution in k-space with a circularly symmetric 5.1 sample-wide Hamming window. The convolution is performed only at the resampling points. Alternative methods such a linear interpolation can also be used to convert images between Cartesian and polar coordinates.

The polar conversion produces N radial points by 512 polar angle points, for an effective angular resolution of 0.352 degrees. The value 512 is an operating parameter and can be adjusted up or down for obtaining greater or lesser angular resolution. Also, since the original image-space data is purely real, the power spectrum has half-plane symmetry. Therefore, recoding only half of the plane is required, effectively doubling the angular sampling rate. Although N radial points is an operating parameter in the conversion to polar coordinates, only the center N/2 radial points or rings (i.e., N/4 to 3N/4) need be computed. The polar conversion technique interpolates values for polar coordinates lying between the Cartesian points.

To increase the contribution of higher frequencies, the power spectrum is converted to a logarithmic scale. However, logarithmic scale conversion is not required.

The polar data representing $I_{Ref}$ is stored for further processing as described below.

Each image $I_A$ is now registered with $I_{Ref}$ by sequentially performing rotation and translation correction for each image $I_A$. Registration of $I_{Ref}$ with itself is performed in the normal sequence of images to validate the choice of operating parameters.

Figure 3:
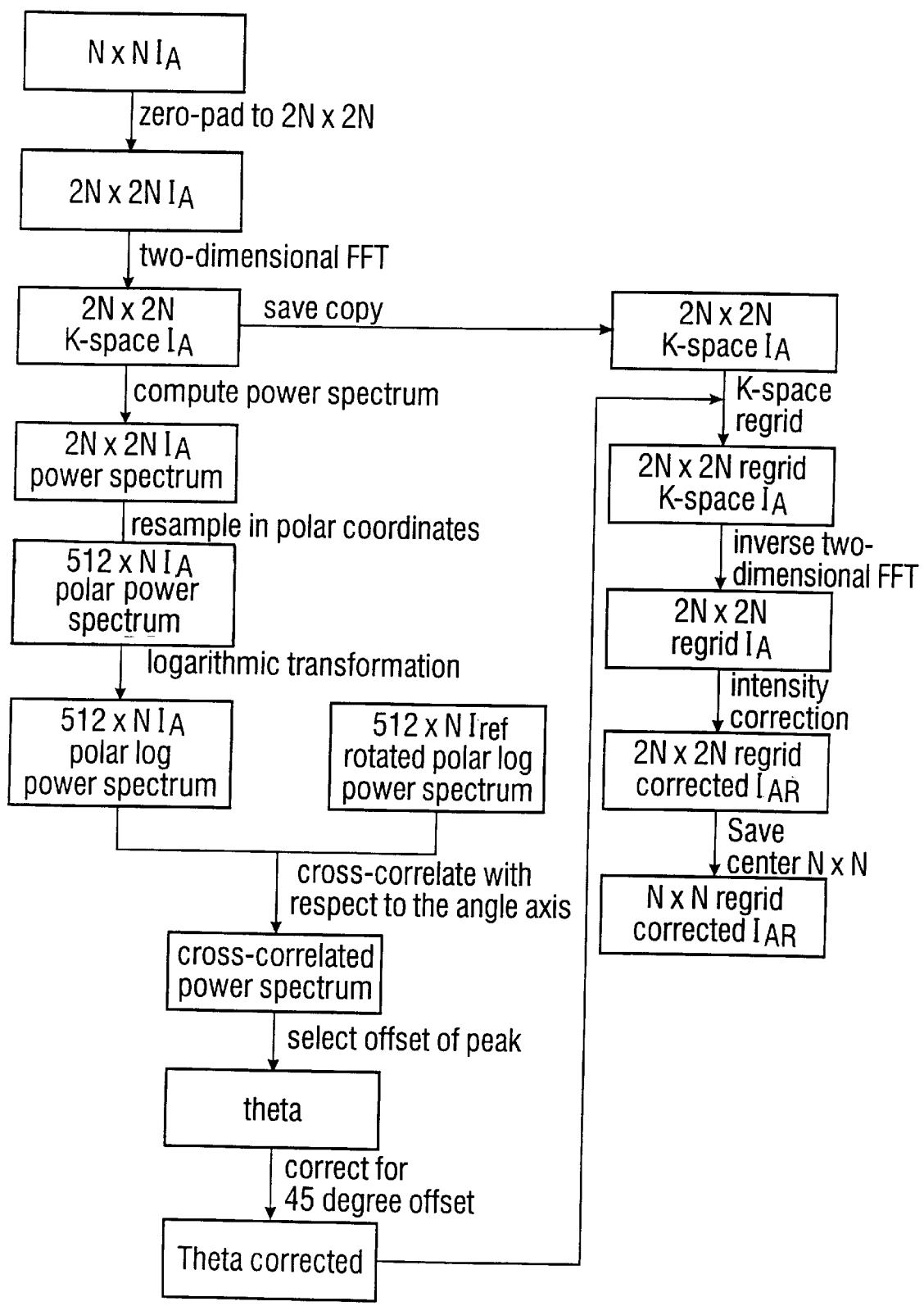
FIG. 3 is a flow chart of rotational correction.

FIG. 3 provides a flow chart of rotational correction. The N-by-N $I_A$ is first zero-padded to generate a 2N-by-2N $I_A$. The 2N-by-2N $I_A$ is converted to k-space by two-dimensional FFT. A copy of the transformed 2N-by-2N $I_A$ is saved for later use.

Next, the power spectrum is computed. The power spectrum is then converted to polar coordinates. This conversion from image-space to k-space polar coordinates is the same for each $I_A$ as for $I_{Ref}$, with the exception that $I_A$ is not rotated by an offset angle. The polar power spectrum is converted to a logarithmic scale. (Once again, the logarithmic scale conversion is optional, and $I_A$ is converted to a logarithmic scale only when the $I_{Ref}$ is also converted to a logarithmic scale.)

To find the estimated correction angle, circular cross-correlation for each of the central N/2 radii with the corresponding reference radii is performed by Fourier methods, see, e.g., R. Bracewell, *The Fourier Transform and its Applications* (McGraw-Hill, 1986). The cross-correlations from each radius are averaged. The peak or maximum offset of the composite cross-correlation is identified by linear search. The peak offset determines the polar angle θ which represents the offset of $I_A$ with respect to $I_{Ref}$ of θ degrees. θ is then corrected for the offset angle adjustment of $I_{Ref}$ discussed above.

$I_A$ is corrected by θ using k-space regridding. To do so, the k-space matrix of the zero-padded 2N-by-2N $I_A$ saved above, is convolved with a circularly symmetric 5.1 sample-wide Hamming window and resampled onto a new grid rotated by the corrected angle θ. The resampled k-space $I_A$ is then converted back to image-space by two-dimensional inverse FFT, leaving a 2N-by-2N image-space $I_A$. Image-intensity variation imparted by the convolution in k-space are then corrected by dividing the values of the resampled and converted $I_A$ by the values corresponding to the inverse Fourier transform of the Hamming window. Alternatively, rather than using regridding, $I_A$ can be rotated by θ using the shift property of Fourier transforms for polar coordinates described above.

The desired image is found in the central N-by-N image data and the remaining data is discarded. The rotationally corrected image, now designated $I_{AR}$, has the same dimensions, resolution, and orientation as $I_{Ref}$.

Figure 6:
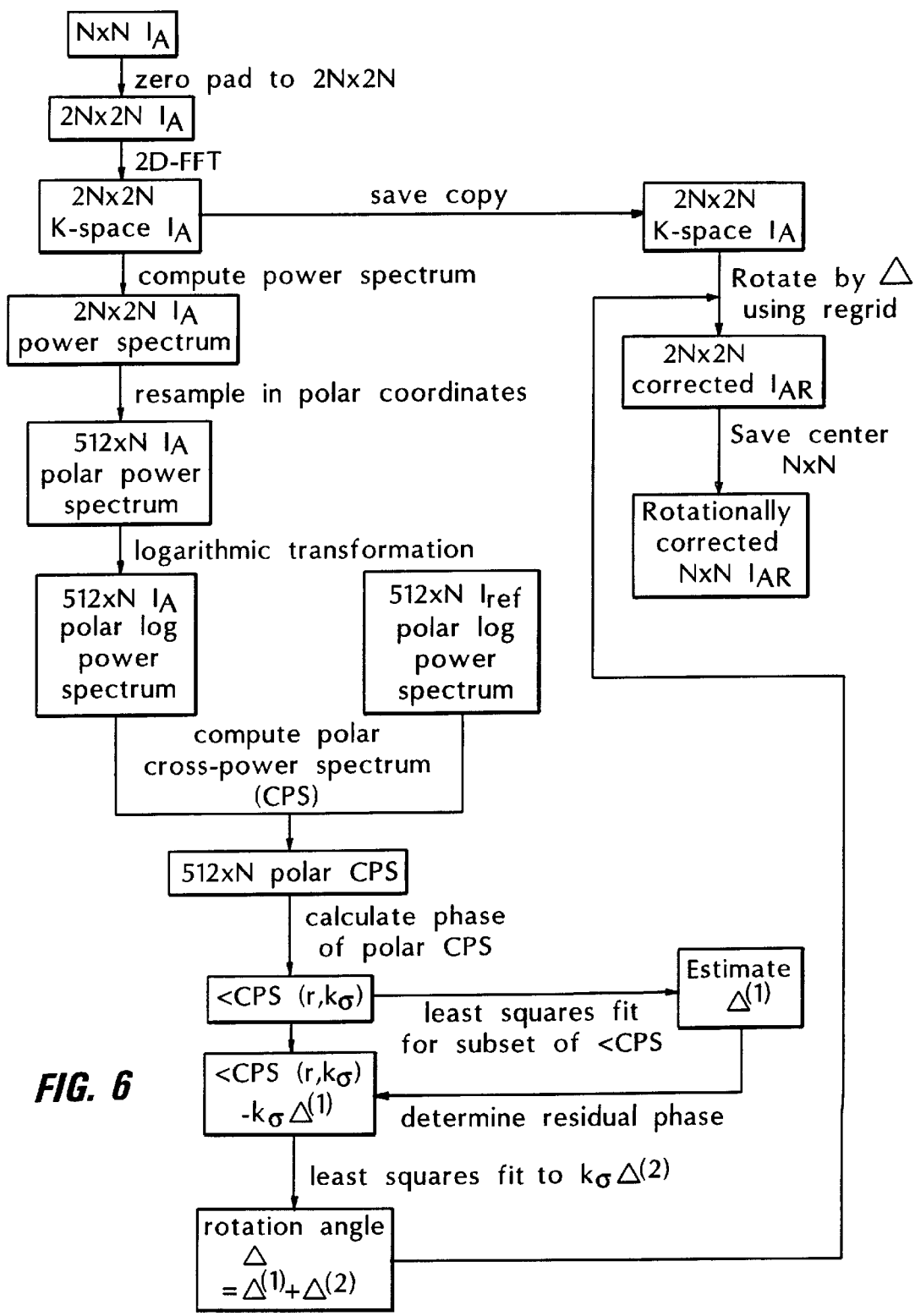
FIG. 6 is a flow chart of an alternative method for rotational correction.

Alternatively, the images $I_A$ can be rotationally registered with $I_{Ref}$ using the method shown by the flow chart in FIG. 6, which uses a polar cross-power spectrum to estimate the rotation angle.

The first set of steps in FIG. 6 are the same as those in FIG. 3. The N-by-N $I_A$ is first zero-padded to generate a 2N-by-2N $I_A$. The 2N-by-2N $I_A$ is converted to k-space by two-dimensional FFT. A copy of the transformed 2N-by-2N $I_A$ is saved for later use. Next, the power spectrum is computed.

The power spectrum is then converted to polar coordinates. This conversion from image-space to k-space polar coordinates is the same for each $I_A$ as for $I_{Ref}$, however, in the embodiment depicted by the flow chart in FIG. 6 $I_{Ref}$ is not rotated by an offset angle. The polar power spectrum is converted to a logarithmic scale. Once again, the logarithmic scale conversion is optional, and $I_A$ is converted to a logarithmic scale only when the $I_{Ref}$ is also converted to a logarithmic scale.

Next, to find the estimated correction angle, the polar cross-power spectrum of the polar logarithmic power spectra $I_A$ and $I_{Ref}$ is determined. To do this, the polar logarithmic power spectra $I_A$ and $I_{Ref}$ are Fourier transformed with respect to polar coordinates and the product of the Fourier transformed logarithmic power spectrum for $I_{Ref}$ is multiplied by the complex conjugate of the polar logarithmic power spectrum for $I_A$ to give the polar cross-power spectrum (CPS). Then the angle of the polar CPS (polar $\angle$CPS) is computed, e.g., by calculating the arctangent of the imaginary component of the CPS divided by the real component of the CPS at each of the data points. The dimensions for the resulting polar $\angle$CPS are N radial frequency points by 512 angular frequency points, or whatever dimensions were selected when converting the power spectrum of $I_{Ref}$ into polar coordinates in FIG. 2.

The rotation angle $\Delta$ between $I_A$ and $I_{Ref}$ is estimated from the polar $\angle$CPS phase data by fitting the phase data to the product $k_\theta \Delta$. As described above, however, values for the product $k_\theta \Delta$ can be outside a $2\pi$ interval, whereas values for the phase data from the polar $\angle$CPS wrap around a $2\pi$ interval. Thus, a first estimate for the rotation angle $\Delta^{(1)}$ is estimated using a least squares regression involving only values for the phase of the polar cross-power spectrum $\angle$CPS(r,$k_\theta$) at values for the angular frequencies $k_\theta$ that are small enough such that $k_\theta \Delta$ is less than $2\pi$. For example, if the rotation angle is known to be less than $2\pi/n$, then there is no phase wrapping for values of the phase $\angle$CPS(r,$k_\theta$) at the first n values of $k_\theta$. Using the first estimate $\Delta^{(1)}$ for the rotation angle, a residual phase equal to $\angle$CPS(r,$k_\theta$)–$k_\theta\Delta^{(1)}$ is calculated for data corresponding to the remaining angular frequencies $k_\theta$. A second least squares regression fits the residual phase to $k_\theta\Delta^{(2)}$ and then the rotation angle $\Delta$ is estimated according to $\Delta=\Delta^{(1)}+\Delta^{(2)}$. Further iterations can be performed as desired.

Alternatively, the others technique described above for unwrapping the phase of $\angle$CPS(r,$k_\theta$) can be used in the flow chart of FIG. 6. All of the methods return an estimated value for the rotation angle $\Delta$ between $I_A$ and $I_{Ref}$.

$I_A$ is then corrected by the rotation $\theta$ using k-space regridding. To do so, the k-space matrix of the zero-padded 2N-by-2N $I_A$ saved above, is convolved with a circularly symmetric 5.1 sample-wide Hamming window and resampled onto a new grid rotated by the corrected angle $\theta$. The resampled k-space $I_A$ is then converted back to image-space by two-dimensional inverse FFT, leaving a 2N-by-2N image-space $I_A$. Image-intensity variation imparted by the convolution in k-space are then corrected by dividing the values of the resampled and converted $I_A$ by the values corresponding to the inverse Fourier transform of the Hamming window. Alternatively, rather than using regridding, $I_A$ can be rotated by $\theta$ using the shift property of Fourier transforms for polar coordinates described above.

The desired image is found in the central N-by-N image data and the remaining data is discarded. The rotationally corrected image, now designated $I_{AR}$, has the same dimensions, resolution, and orientation as $I_{Ref}$.

In the rotational corrections shown in the flow charts of FIGS. 3 and 6, the power spectra of $I_A$ and $I_{Ref}$ are determined and then resampled in polar coordinates. Determining the power spectra uncouples any rotation between $I_A$ and $I_{Ref}$ from any translation between $I_A$ and $I_{Ref}$. As described above, any translation between the images is converted into phase information in the Fourier transformed images and determining the power spectra eliminates the phase information. In contrast, if there is a rotation between the images, there will be an identical rotation between the Fourier transforms of the images, including the magnitude component of the Fourier transforms or the power spectra, which equal the square of such magnitudes. Therefore, rather than determining the power spectra of the images and estimating rotation between the power spectra in the flow charts of FIGS. 3 and 6, in other embodiments it is the magnitude component of the Fourier transform of $I_A$ and $I_{Ref}$ that is determined and for which rotation is estimated. More generally, any function of the magnitude component (i.e., the absolute value) of the Fourier transform of $I_A$ and $I_{Ref}$ can be used to generate centered images.

Figure 4:
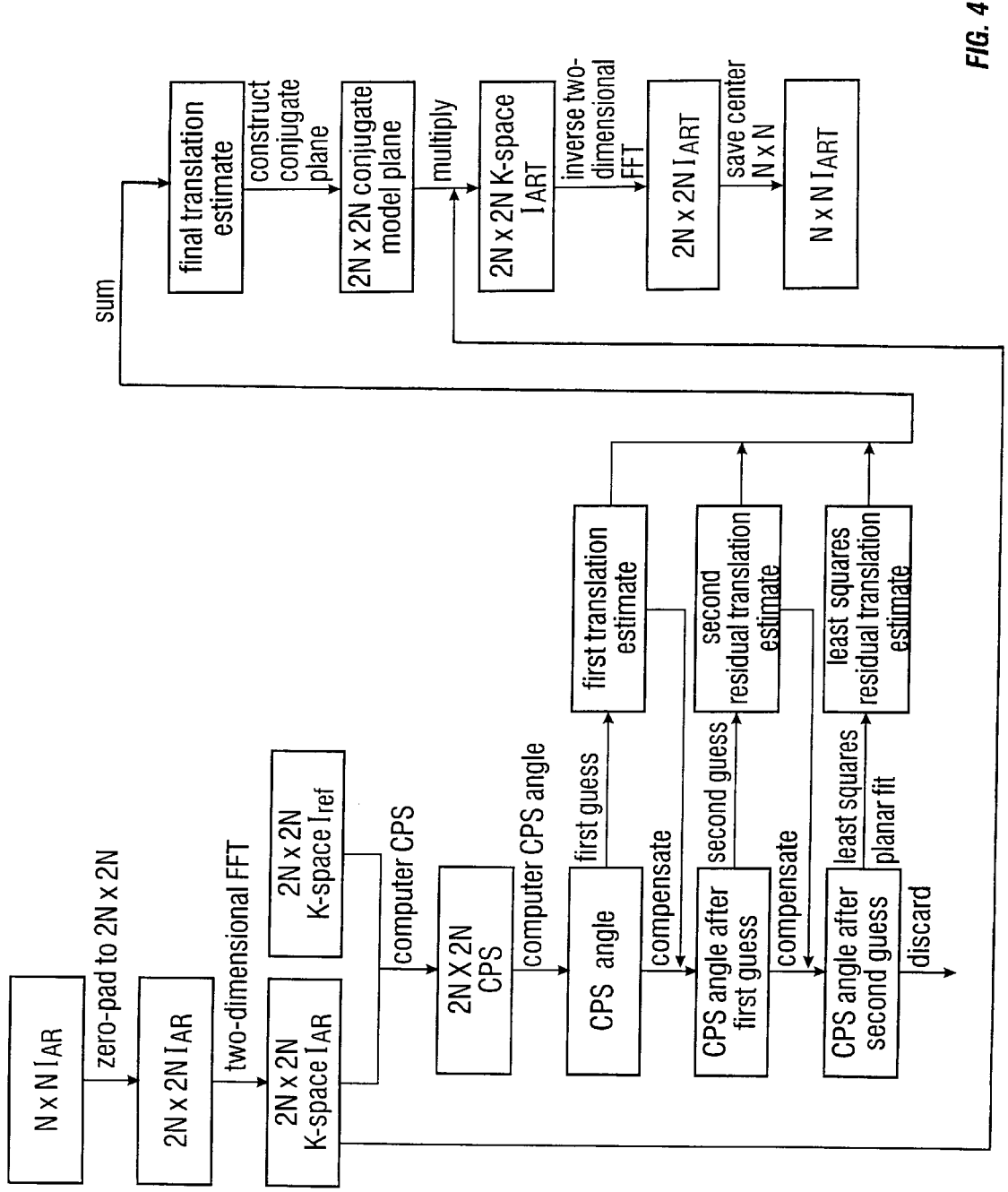
FIG. 4 is a flow chart of translational correction.

Even though the rotationally corrected image, $I_{AR}$, has the same orientation as $I_{Ref}$, it may still have a translation shift. FIG. 4 provides a flow chart of the translational correction.

First, the N-by-N, rotationally corrected $I_{AR}$ is zero-padded and converted to k-space by two-dimensional fast Fourier transformation. The cross-power spectrum of $I_{AR}$ and $I_{Ref}$ is computed by conjugate multiplication of the k-space samples, and the phase is computed with the arctangent function as needed.

To allow for larger translational displacements, which may result in phase wrapping, an automated first guess for $\Delta x$ and $\Delta y$ displacements is made using only the first k-space sample along each frequency axis, followed by a second guess including the remodulated first and second samples equally weighted. The first guess is a rough estimate that provides great certainty that there will be no phase jump between the first and second points, i.e., no wrapping problem. The second guess generally provides accuracy within one pixel so that the entire data set can now be used without the danger of phase wraps corrupting the final fit.

After both the first and second guesses, the cross-power spectrum is appropriately remodulated, and the final correction estimate is made by phase-plane estimation, with parameters computed by the least-squares method. To reduce noise effects during fitting, each frequency is weighted by its cross-power spectrum magnitude. The least-squares fit is performed over the lowest half of frequencies, allowing for a residual motion of up to $\sqrt{2}$ pixels in any direction before phase wrapping occurs. The final linear displacement parameters are computed from the initial guesses and the planar fit, and are used to define the conjugate model plane for phase-plane conjugation.

After each k-space value of $I_{AR}$ is appropriately multiplied, the 2N-by-2N k-space image, now designated $I_{ART}$ is transformed back to image-space by two-dimensional inverse FFT. Once again, the desired image is the central N-by-N array, and the remaining outer data is discarded.

The rotational and translational corrections are performed sequentially for each image $I_A$ from 1 to M. The time series image data is now registered and ready for further analysis.

Registration of multiple frames of image data to remove motion artifacts is also useful for other types of two-dimensional image data sets, including computed tomography, X-ray, and traditional photography images. In fact, registration can be used to remove motion artifacts from any two-dimensional data set subject to planar rigid body motion. The motion can be either "true" motion or shifting of the subject, or motion of the image capturing device.

Figure 5:
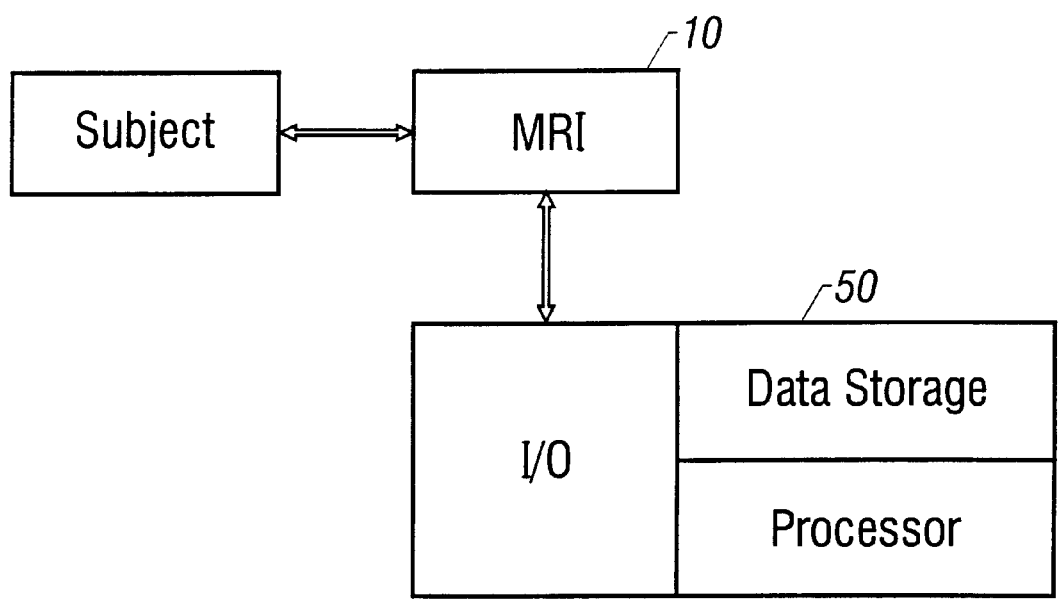
FIG. 5 is a block diagram of a registration system.

A registration system is shown in FIG. 5. As discussed above, MRI scanner 10 acquires the images and converts the information to image data. The time series image data is then transferred to registration system 50, which includes an input/output port 51, data storage 52, and processor 53. Processor 53 is programmed to perform the computations described above in order to make the rotational and translational corrections. Data storage 52 can be any suitable data storage device, including magnetic tape, magnetic disk, or semiconductor memory. Input/output port 51 is of known design and capable of communicating with other devices by various known protocols.

In one embodiment, registration system 50 includes a DEC 5000/240 workstation running the Ultrix 4.3 UNIX operating system. Software suitable to run on the DEC workstation and perform the required computations is included in the source code below and the source code in a Microfiche Appendix included in copending application U.S. Ser. No. 08/639,824 referenced above. The software is written in the C programming language. Other embodiments include an HP 9000/735/125 workstation running HP-UX 9.05, a Sun SPARC 10 running SunOS 4.1.3, a DEC Alphastation 500/333 running digital UNIX.

More generally, the invention can be implemented in hardware or software, or a combination of both. The image registration method can be implemented in computer programs using standard programming techniques following the method steps and figures described herein. The programs should be designed to execute on programmable computers each comprising a processor, a data storage system (including memory and/or storage elements), at least one input device, and at least one output device, such as a CRT or printer. Program code is applied to input data to perform the functions described herein and generate output information. The output information is applied to one or more output devices such as a CRT, as described herein.

Each program is preferably implemented in a high level procedural or object oriented programming language to communicate with a computer system. However, the programs can be implemented in assembly or machine language, if desired. In any case, the language can be a compiled or interpreted language.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

OTHER EMBODIMENTS

It is to be understood that while the invention has been described in conjunction with the detailed description thereof, that the foregoing description is intended to illustrate and not limit the scope of the invention, which is defined by the scope of the appended claims. For example, the images to be registered can be represented values on a non-Cartesian grid, which are then resampled onto a Cartesian or polar grid as necessary. In particular, the images to be registered can be Orbital Navigator Echoes for which there is data for different polar angles and a single radial distance. Furthermore, when using the cross-power spectrum to estimate a rotationally correction angle, the polar images can include different polar angle sampling rates for each radial distance. Finally, the image registration methods can be used to measure a time series of images recorded by any imaging modality, including, e.g., dynamic Computed Tomography, ultrasound measurements, and other imaging methods described herein.

Other aspects, advantages, and modifications are within the scope of the following claims.

The application further includes the source code appended below, which can be used in conjunction with the source code in a Microfiche Appendix included in copending application U.S. Ser. No. 08/639,824 referenced above, which Appendix is incorporated herein by reference in its entirety, to carry out an embodiment of the methods and systems described herein.

```
================================================================
This code forms a portion of the
DART REGISTRATION ALGORITHM - Version 1.10
and is © 1995–1998 by Luis C. Maas III
================================================================
*/
#include "process.h"
#include "processOps.h"
#include "epiFileOps.h"
#include "globals.h"
#include "fft.h"
EPISlice ProcessSlice (EPISlice epiSlice, short ref_frame) {
    short     index;
    Reference reference;
    MotionRec motionRec;
    char      filename[256];
    FILE      *fp;
```

-continued

```
sprintf(filename, "mot.params.s%d", epiSlice->sliceNum); fp = fopen(filename, "w");
/* INITIALIZATION - INVOLVING REFERENCE FRAME ONLY */
reference = CreateReference(epiSlice, ref_frame);
/* COMPUTE REFERENCE FRAME BIASES */ ProcessImage(epiSlice, &motionRec, reference, ref_frame, 1);
reference->ref_bias.delta_angle = motionRec.delta_angle; reference->ref_bias.delta_x   = motionRec.delta_x;
reference->ref_bias.delta_y    = motionRec.delta_y;
/* LOOP THROUGH IMAGE SET */
for (index=1; index<=epiSlice->epiInfo->numImages; index++)
if (!ProcessImage(epiSlice, &motionRec, reference, index, 0))
/*ERROR HAS OCCURRED, QUIT*/
return(NULL);
else {
fprintf(fp, "%f\t%f\t%f\n", motionRec.delta_angle,
motionRec.delta_x, motionRec.delta_y);
}
/* CLEAN UP - DESTROY TEMPORARY VARIABLES */ DisposeReference(reference);
fclose(fp);
return(epiSlice);
}
Reference CreateReference (EPISlice epiSlice, short ref_frame) {
Reference reference;
FloatImage ref_kspace, ref_kspace_rot;
FloatImage ref_kspace_rot_PS, ref_kspace_rot_rtheta; FloatImage filter_ispace;
long      image_offset;
MRImageRec mrimageRec;
reference = (Reference) malloc (sizeof(ReferenceRec));
/* Compute k-space for reference frame */ image_offset = ((long)(epiSlice->epiInfo->sizeX) *
(long)(epiSlice->epiInfo->sizeY));
image_offset *= (ref_frame − 1);
mrimageRec.sizeX = epiSlice->epiInfo->sizeX; mrimageRec.sizeY = epiSlice->epiInfo->sizeY; mrimageRec.data =
epiSlice->epiData + image_offset; ref_kspace = ImageFFT(&mrimageRec, 2, 2);
/* Compute i-space for filter */
filter_ispace = CreateFilter (ref_kspace->sizeX, ref_kspace->sizeY);
/* Compute rotated k-space for reference */ ref_kspace_rot = CopyFloatImage (ref_kspace);
RotateKSpace(ref_kspace_rot, filter_ispace, g_rotationOffset); ref_kspace_rot_PS = ComputeCrossPS
(ref_kspace_rot, ref_kspace_rot, 0); DisposeFloatImage(ref_kspace_rot);
ref_kspace_rot_PS->data[0] = 0.0; /* ZERO D.C. COMPONENT */ FFTShift(ref_kspace_rot_PS);
ref_kspace_rot_rtheta = RThetaRecode(ref_kspace_rot_PS); DisposeFloatImage(ref_kspace_rot_PS);
reference->ref_kspace      = ref_kspace; reference->ref_kspace_rot_rtheta = ref_kspace_rot_rtheta; reference-
>filter_ispace    = filter_ispace; return(reference);
}
EPISlice ProcessImage
(EPISlice epiSlice, Motion motion, Reference reference,
short image_num, int ref_bias)
{
FloatImage kspace, ispace;
MRImageRec mrimageRec;
long      image_offset;
image_offset = ((long)(epiSlice->epiInfo->sizeX) *
(long)(epiSlice->epiInfo->sizeY));
image_offset *= (image_num − 1);
mrimageRec.sizeX = epiSlice->epiInfo->sizeX; mrimageRec.sizeY = epiSlice->epiInfo->sizeY; mrimageRec.data =
epiSlice->epiData + image_offset;
kspace = ImageFFT (&mrimageRec, 2, 2);
AlignRotation    (motion, reference, kspace, ref_bias); AlignTranslation (motion, reference, kspace, ref_bias); ispace =
ReturnSmallImage(kspace);
if (!ref_bias) WriteImage (ispace, epiSlice->sliceNum); DisposeFloatImage(kspace);
DisposeFloatImage(ispace);
return (epiSlice);
}
void AlignRotation (Motion motion, Reference reference, FloatImage kspace,
int ref_bias)
{
double   rotation;
rotation = EstimateRotation(reference->ref_kspace_rot_rtheta, kspace); if (ref_bias) { motion->delta_angle = rotation;
return; }
rotation −= reference->ref_bias.delta_angle; motion->delta_angle = rotation;
RotateKSpace (kspace, reference->filter_ispace, rotation);
}
double EstimateRotation (FloatImage kSpace1rt, FloatImage kSpace2) {
FloatImage kSpace2ps, kSpace2rt, kSpace1rtCopy;
float     *thetaCC;
short     sizeTheta, posT, maxT;
double    sumT2, sumTPhase, phase, mag, rotation; FILE    *fp;
kSpace1rtCopy = CopyFloatImage (kSpace1rt); kSpace2ps = ComputeCrossPS (kSpace2, kSpace2, 0); kSpace2ps-
>data[0]=0.0;
FFTShift(kSpace2ps);
kSpace2rt = RThetaRecode(kSpace2ps); DisposeFloatImage(kSpace2ps);
thetaCC = ThetaXCor (kSpace1rtCopy, kSpace2rt); /*COMPUTE CPS*/ sizeTheta = kSpace1rt->sizeX;
```

```
DisposeFloatImage(kSpace1rtCopy);
DisposeFloatImage(kSpace2rt);
/* EXACTLY ONE OF THE FOLLOWING WILL BE DEFINED: NEWWAY or OLDWAY */
#ifdef OLDWAY
/* < 1.10 THE OLD WAY
used a real cross-correlation array and picked maximum value offset */
for (maxT=posT=0; posT<sizeTheta; posT++)
if (thetaCC[posT] > thetaCC[maxT])
maxT=posT;
rotation=((float)180*maxT/sizeTheta);
#endif /* OLDWAY */
#ifdef NEWWAY
/* 1.10 THE NEW WAY - subquanta accuracy by phase-slope mapping
we'll look at a positive frequencies only b/c of symmetry.
Goal: find slope m which minimizes the error E:
E=SUM Abs(PS)*(Phase(PS)-m*fx)^2
 fx
SUM Abs(PS)*fx*Phase(PS)
reduces to: m= -------------------------
SUM Abs(PS)*fx*fx
*/
/* First remodulate to remove the old reference angle, if used.
This also eliminates need to correct later in AlignRotation
NB. only a quarter of the frequency space is processed -- allowing some protection from large rotations. */
{
double di, dr;
double c, s;
for (posT=0; posT<sizeTheta/8; posT++) {
c = cos(-2*posT*g_rotationOffset/180*3.14159265); s = sin(-2*posT*g_rotationOffset/180*3.14159265); dr =
thetaCC[posT*2] * c - thetaCC[posT*2+1] * s; di = thetaCC[posT*2] * s + thetaCC[posT*2+1] * c;
thetaCC[posT*2]   = dr/(double)1000000000000.0; thetaCC[posT*2+1] = di/(double)1000000000000.0;
}
}
/* optional guess(es) may be inserted here to reduce risk of
wrap-related inaccuracies. */
sumT2=sumTPhase=0; /*REGRESSION*/
for (posT=1; posT<sizeTheta/8; posT++) {
phase = atan2((double)thetaCC[posT*2+1], (double)thetaCC[posT*2])
*180.0/3.14159264;
mag = sqrt((double)thetaCC[posT*2]   * (double)thetaCC[posT*2] +
(double)thetaCC[posT*2+1] * (double)thetaCC[posT*2+1] );
sumT2      += posT*posT*mag;
sumTPhase  += posT*phase*mag;
}
rotation = sumTPhase/(2*sumT2);
#endif /*NEWWAY*/
if (rotation > 90.0) rotation -= 180.0; free(thetaCC);
return(rotation);
}
float * ThetaXCor (FloatImage image1rt, FloatImage image2rt) {
short posT, posR, maxT1, maxT2, sizeT, sizeR; float  *sumFFT, *rangeFFT1, *rangeFFT2; float tempr, tempi;
sizeR = image1rt->sizeY;
sizeT = image1rt->sizeX;
/* allocate contiguous memory */
sumFFT=(float *)malloc((long)sizeof(float)*sizeT*2); for (posT=0; posT<sizeT*2; posT++) sumFFT[posT]=0.0;
for (posR=sizeR/4; posR<=sizeR*3/4; posR++) {
/* Compute ffts by row, in place */
rangeFFT1 = image1rt->data + posR*sizeT*2; rangeFFT2 = image2rt->data + posR*sizeT*2;
four1(rangeFFT1, sizeT, 1);
four1(rangeFFT2, sizeT, 1);
/* compute circular cross correlation in frequency space
by multiplying fft1 by conjugate of fft2, then add result to composite frequency space sum if appropriate */
for (posT=2; posT<sizeT*2; posT+=2) {
tempr=(rangeFFT1[posT]   * rangeFFT2[posT] +
rangeFFT1[posT+1] * rangeFFT2[posT+1])/sizeT;
tempi=(rangeFFT1[posT+1] * rangeFFT2[posT] -
rangeFFT1[posT]   * rangeFFT2[posT+1])/sizeT;
rangeFFT1[posT]   = tempr;
rangeFFT1[posT+1] = tempi;
if (posR>=sizeR/4 && posR<=sizeR*3/4) {
sumFFT[posT]   += tempr*2/sizeR;
sumFFT[posT+1] += tempi*2/sizeR;
}
}
}
/* 1.10 - the following section is left out to leave result in frequency
suitable for phase slope mapping when NEWWAY is defined*/
#ifdef OLDWAY
/* invert the sum FFT to get the circular cross correlation */ four1(sumFFT, sizeT, -1);
```

-continued

```
/* reduce data set by keeping only real components*/ for (posT=0; posT<sizeT; posT++)
    sumFFT[posT] = sumFFT[posT*2];
/* release extra memory */
sumFFT=(float *)realloc(sumFFT, (long)sizeof(float)*sizeT);
#endif /* OLDWAY */
return(sumFFT);
}
```

What is claimed is:

1. A method for rotationally aligning a first image with a second image, the method comprising:

providing first and second polar centered images related to the first and second images, wherein the first and second polar centered images comprise values on a polar grid having evenly spaced polar angle coordinates for each of at least one radial distance coordinate;

calculating a polar cross-power spectrum for the first and second polar centered images, the polar cross-power spectrum comprising a phase profile having at least polar angular frequency coordinates;

fitting a linear function of the angular frequency coordinate to the phase profile of the polar cross-power spectrum to determine a correction angle; and rotating the first image by the correction angle to rotationally align the first and second images.

2. The method of claim 1, wherein the first and second images each comprise values on an evenly spaced Cartesian grid, and wherein providing the first and second polar centered images comprises:

Fourier transforming the first and second images to produce first and second k-space images, wherein values of the first and second k-space images comprise complex values on an evenly spaced k-space Cartesian grid;

generating first and second centered images from the first and second k-space images with a mapping function that maps the absolute value of each complex value in the first and second k-space images to generate a corresponding value in the first and second centered images; and converting the first and second centered images from Cartesian coordinates to polar coordinates to produce the first and second polar centered images.

3. The method of claim 2, wherein the mapping function squares the absolute value of each complex value in the first and second k-space image to produce the corresponding value in the first and second centered images.

4. The method of claim 2, wherein the mapping function leaves the absolute value of each complex value in the first and second k-space image unchanged to produce the corresponding value in the first and second centered images.

5. The method of claim 2, wherein converting comprises logarithmically scaling the first and second centered images with respect to a radial frequency component to produce the first and second polar centered images.

6. The method of claim 1, wherein the first and second images are centered images that each comprise values on a Cartesian grid, and wherein providing the first and second polar centered images comprises:

converting the first and second centered images from Cartesian coordinates to polar coordinates to produce first and second polar centered images.

7. The method of claim 1, wherein the first and second images are the first and second polar centered images.

8. The method of claim 2, wherein rotating comprises:

converting the first image into polar coordinates to produce a first polar image;

Fourier transforming the first polar image with respect to the polar angle coordinate;

multiplying the Fourier transformed first polar image by a complex exponential having the linear function as an argument;

inverse Fourier transforming the multiplied Fourier transformed first polar image with respect to the polar angle coordinate to produce a rotated first polar image; and converting the rotated first polar image into Cartesian coordinates to produce a rotated first image.

9. The method of claim 8, wherein the complex exponential is $\exp(-ik_\theta \Delta)$, where $k_\theta$ is the polar angular frequency coordinate and $\Delta$ is the correction angle.

10. The method of claim 1, wherein the polar cross-power spectrum and phase profile are matrices having polar angular frequency coordinates and radial distance coordinates.

11. The method of claim 1, wherein the polar cross-power spectrum and the phase profile are vectors having only polar angular frequency coordinates.

12. The method of claim 1, wherein the linear function is $k_\theta \Delta$ where $k_\theta$ is the polar angular frequency coordinate and $\Delta$ is the correction angle.

13. The method of claim 1, wherein fitting comprises unwrapping values for the phase profile based on an estimate of the correction angle.

14. The method of claim 13, wherein fitting further comprises determining the estimate by fitting a subset of values for the phase profile to the linear function, wherein the subset of values corresponds to angular frequencies $k_\theta$ that are less than $2\pi$ divided by an upper limit for the correction angle.

15. The method of claim 1, wherein fitting comprises determining a first estimate $\Delta^{(1)}$ for the correction angle based by fitting a subset of values for the phase profile to the linear function, wherein the subset of values corresponds to angular frequencies $k_\theta$ that are less than $2\pi$ divided by an upper limit for the correction angle.

16. The method of claim 15, wherein fitting further comprises determining a correction to the first estimate $\Delta^{(1)}$ by calculating a residual phase equal to the phase profile subtracted by $k_\theta \Delta^{(1)}$ and fitting the residual phase to another linear function.

17. The method of claim 1, wherein fitting comprises using a least squares regression.

18. A method of aligning a first image with a second image, the method comprising:

rotationally aligning the first image with the second image using the method of claim 2; and translationally aligning the rotationally aligned first image with the second image.

19. A method for aligning a first image with a second image, wherein the first and second images each comprise values on a Cartesian grid, the method comprising:

calculating power spectra for the first and second images;

converting the power spectra from Cartesian coordinates to polar coordinates;

calculating a polar cross-power spectrum for the polar power spectra, the polar cross-power spectrum comprising a phase profile having at least polar angular frequency coordinates;

fitting a linear function of the polar angular frequency coordinate to the phase profile of the polar cross-power spectrum to determine a correction angle that rotationally aligns the power spectra;

rotating the first image by the correction angle; and translationally aligning the rotated first image with the second image.

20. Apparatus comprising a computer readable medium storing a program that causes a processor to perform the steps of claim 1.

21. Apparatus comprising a computer readable medium storing a program that causes a processor to perform the steps of claim 2.

22. Apparatus comprising a computer readable medium storing a program that causes a processor to perform the steps of claim 19.

23. A system for processing a series of images, the system comprising:

an input port that receives the series of images;

a data storage device, operably coupled with the input port, that stores the images; and a processor, operably coupled with the input port and data storage device, that registers the images;

wherein the processor performs the steps of claim 1.

24. A system for processing a series of images, the system comprising:

an input port that receives the series of images;

a data storage device, operably coupled with the input port, that stores the images; and a processor, operably coupled with the input port and data storage device, that registers the images;

wherein the processor performs the steps of claim 2.

25. A system for processing a series of images, the system comprising:

an input port that receives the series of images;

a data storage device, operably coupled with the input port, that stores the images; and a processor, operably coupled with the input port and data storage device, that registers the images;

wherein the processor performs the steps of claim 19.

* * * * *

UNITED STATES PATENT AND TRADEMARK OFFICE
CERTIFICATE OF CORRECTION

PATENT NO. : 6,178,271 B1
DATED : January 23, 2001
INVENTOR(S) : Luis C. Maas

It is certified that error appears in the above-identified patent and that said Letters Patent is hereby corrected as shown below:

Column 2,
Line 44, delete "feature", insert -- features --

Column 8,
Line 20, delete "$k_{74}\Delta$", insert -- $k_\theta\Delta$ --

Column 10,
Line 37, delete "Ax and Ay", insert -- $\Delta x$ and $\Delta y$ --

Column 19,
Line 16, insert -- ^ -- before 2 (*(Phase(PS)-m*fx)^2)

Signed and Sealed this

Twenty-fourth Day of December, 2002

JAMES E. ROGAN
*Director of the United States Patent and Trademark Office*